United States Patent [19]
Scott et al.

[11] 3,774,033
[45] Nov. 20, 1973

[54] DUAL SPACED EPITHERMAL NEUTRON DETECTOR POROSITY LOGGING

[75] Inventors: Hubert D. Scott, Houston; Michael P. Smith, Bellaire, both of Tex.

[73] Assignee: Texaco Inc., New York, N.Y.

[22] Filed: May 17, 1972

[21] Appl. No.: 254,282

[52] U.S. Cl. .............................. 250/266, 250/83.1
[51] Int. Cl. ............................................. G01t 3/00
[58] Field of Search ...................... 250/83.6 W, 83.1

[56] References Cited
UNITED STATES PATENTS

| | | | |
|---|---|---|---|
| 2,667,583 | 1/1954 | Herzog | 250/83.6 W |
| 2,469,463 | 5/1949 | Russell | 250/83.6 W |
| 2,469,462 | 5/1949 | Russell | 250/83.6 W |
| 2,220,509 | 11/1940 | Brons | 250/83.6 W |
| 2,920,204 | 1/1960 | Youmans | 250/83.6 W |
| 3,532,884 | 10/1970 | Dewan | 250/83.6 W |
| 3,654,467 | 4/1972 | Tittman | 250/83.6 W |

Primary Examiner—Harold A. Dixon
Attorney—Thomas H. Whaley et al.

[57] ABSTRACT

An illustrative embodiment of the invention includes method and apparatus for making earth formation porosity measurements in open or cased well boreholes. A high intensity (1.69 × 10$^9$ neutrons/sec.) californium 252 neutron source is used to irradiate earth formations surrounding a well borehole with high energy neutrons. As the high energy neutrons interact with the materials comprising the earth formation their energy is reduced and some having epithermal energy are deflected back into the borehole at spaced distances from the neutron source. Two epithermal energy neutron detectors spaced at different vertical distances from the neutron source and from each other are used to measure the epithermal neutron population at the different distances. The ratio of the counting rates in the two detectors may be interpreted in terms of earth formation porosity by means of a predetermined relationship.

9 Claims, 2 Drawing Figures

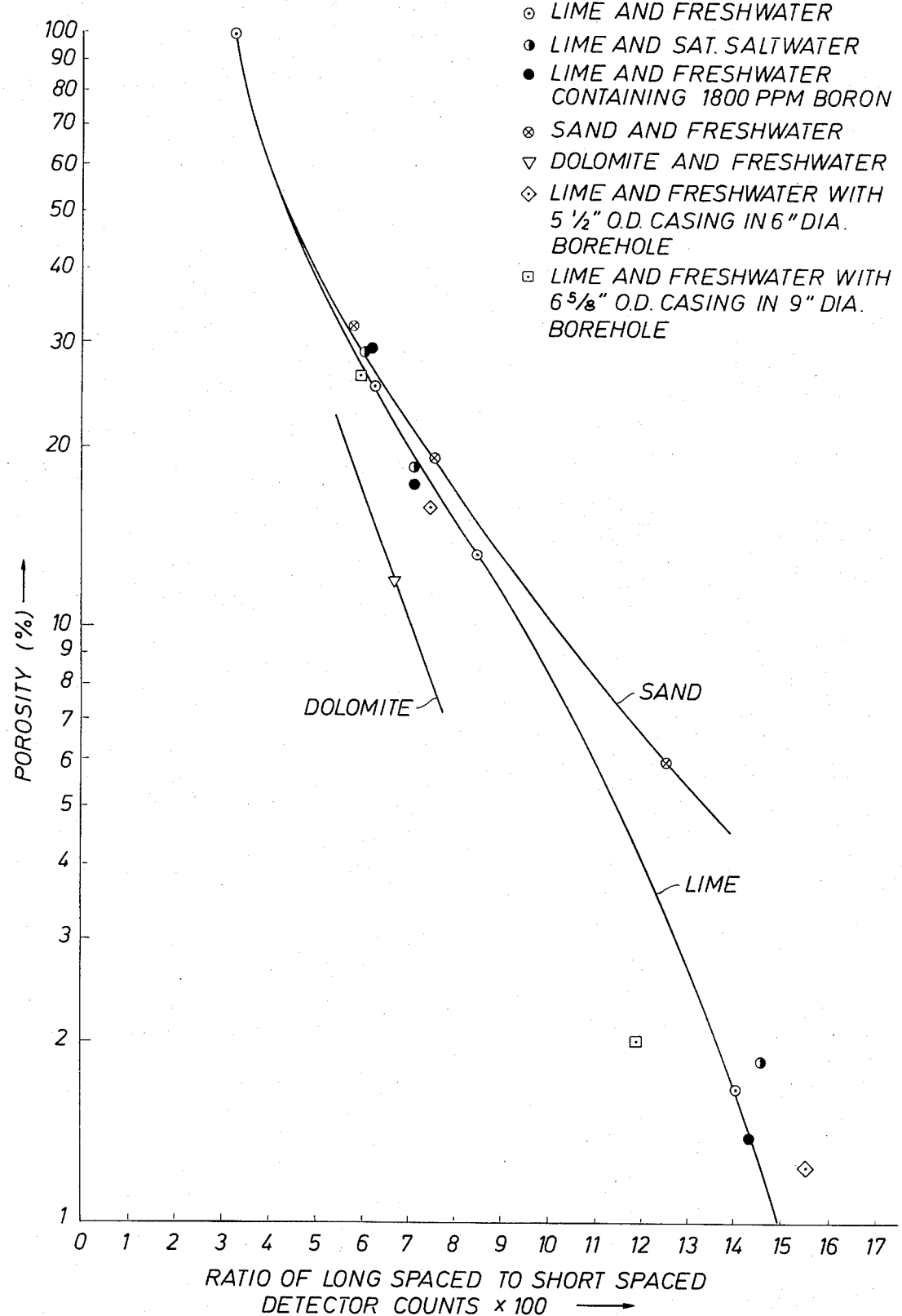

DUAL SPACED EPITHERMAL NEUTRON DETECTOR POROSITY LOGGING

BACKGROUND OF THE INVENTION

This invention relates to radiological well logging methods and apparatus for investigating the characteristics of subsurface earth formations traversed by a borehole and more particularly to apparatus and methods for measuring earth formations porosities by means of neutron well logging techniques.

It is well known that oil and gas are more likely to be found in commercially recoverable quantities from those earth formations which are relatively porous or permeable than in more highly consolidated earth formations. Thus, equipment and methods for accurately identifying the porosity of earth formations has substantial industrial importance.

Various methods and apparatus have been proposed in the prior art for utilizing neutron diffusion through earth formations to measure porosity. Typically, proposals of this sort have suggested the use of a pressure housing sonde containing a neutron source and a pair of neutron detectors spaced at different distances from the source for transport through a borehole. The thermal neutron detectors utilized in prior art techniques have been used with both pulsed and continuous neutron sources and some combination utilizing the pulse count of the detected thermal neutrons has been related to the hydrogen content of the portion of the earth formation being subjected to the flow of neutrons from the neutron source. These methods have generally not proven to be as accurate as desirable due to the diameter irregularities of the borehole wall. The variation of the properties of different borehole fluids, the irregular cement annulus surrounding the casing in a cased borehole, and the properties of different types of steel casings and earth formations surrounding the borehole have all tended to obscure the thermal neutron measurements suggested in the prior art.

The thermal neutron population surrounding a source and detector pair sonde as proposed in the prior art can be affected by the chlorine content of the borehole fluid. Similarly other lithological factors such as the boron content of the earth formations surrounding the cased borehole affect thermal neutron populations. Measurements of thermal neutron captures are utilized in neutron lifetime logs or thermal neutron population die away logs of various types as contemplated in the prior art. The present invention, however, rather than relying on a measure of the thermal neutron population, utilizes a measurement of the epithermal neutron population by means of two spaced neutron detectors each longitudinally spaced from a neutron source having a relatively high intensity neutron flux. Special detector means are utilized in the invention to effectively discriminate against the detection of thermal neutrons as proposed in the prior art.

Thus, it is an object of the invention to provide an improved method and apparatus for measuring the porosity of earth formations.

Another object of the present invention is to provide a dual spaced epithermal neutron population measurement for obtaining a more accurate estimate of the porosity of earth formations surrounding a well borehole.

In accordance with the invention, a relatively high intensity continuous neutron source irradiates earth formations surrounding a well borehole with a flux of neutrons. A pair of epithermal neutron detectors spaced longitudinally along the axis of the well tool from each other and from the neutron source measure the intensity of the epithermal neutrons at the two differently spaced distances from the source. The ratio of the counts occurring in each of the two spaced epithermal neutron detectors are then interpreted in terms of the earth formation porosity in accordance with a predetermined relationship. The apparatus of the present invention has been found to give improved results from prior art devices in that less sensitivity to disturbing environmental parameters results from its use.

For a better understanding of the present invention, together with other and further objects, features and advantages, reference is made to the following detailed description thereof, when taken in conjunction with the appended drawings in which:

BRIEF DESCRIPTION OF THE DRAWINGS

FIG. 2 is a graph illustrating the relationship between the ratio of the counts in the two epithermal neutron detectors of a well logging system such as that of FIG. 1 to the porosity of earth formations surrounding a borehole.

DESCRIPTION OF THE PREFERRED EMBODIMENTS

Figure 1:
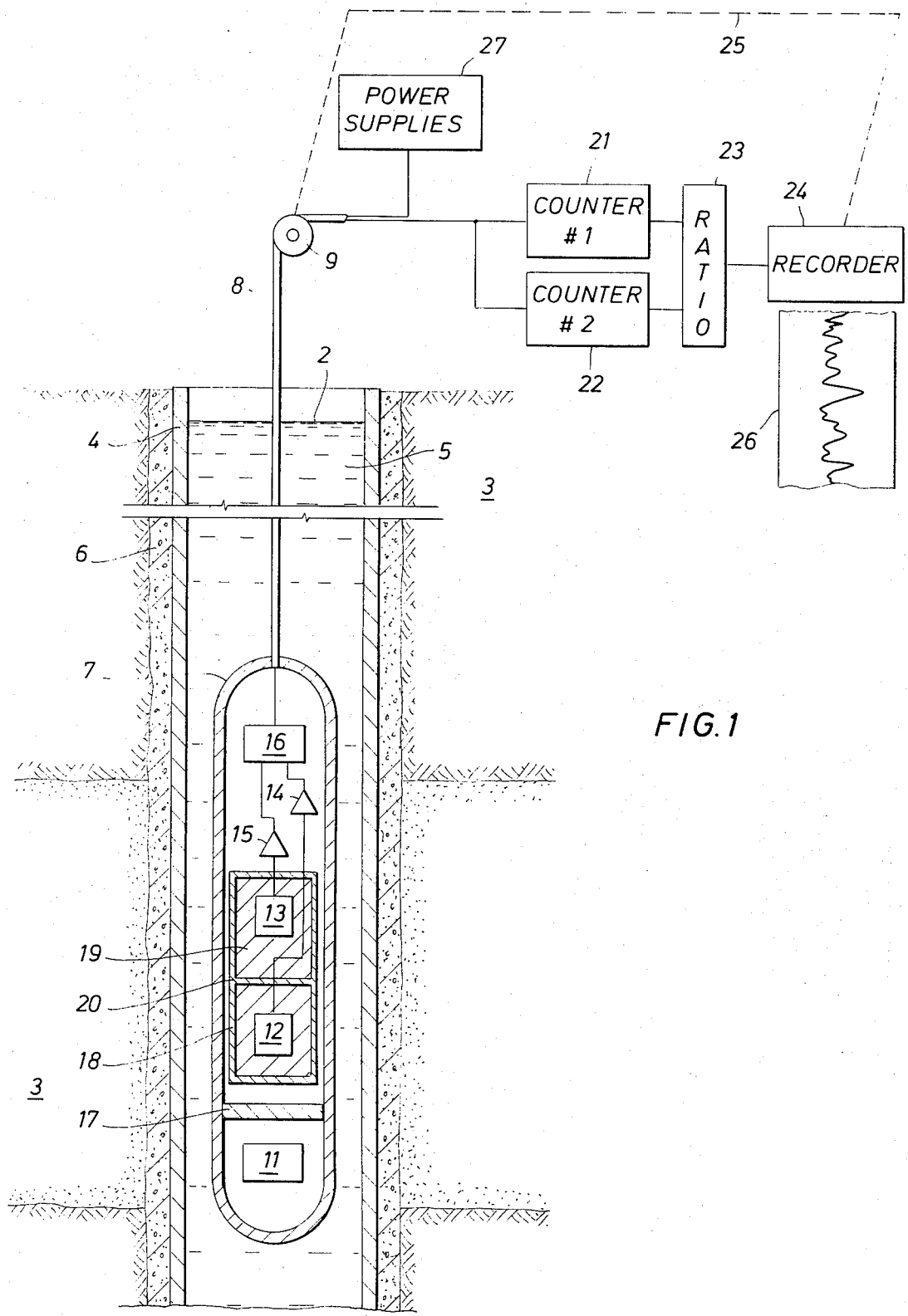
FIG. 1 is a schematic diagram showing a well logging system in accordance with the principles of the present invention.

Referring initially to FIG. 1 there may be seen a simplified, schematic, functional representation in the form of a block diagram of well logging apparatus in accordance with the present invention. A well borehole 2 penetrating earth formations 3 is lined with a steel casing 4 and filled with a well fluid 5. The steel casing 4 is cemented in place by a cement layer 6 which also serves to prevent fluid communication between adjacent producing formations in the earth 3.

The downhole portion of the logging system may be seen to be basically composed of an elongated, fluid tight, hollow, body member or sonde 7 which, during the logging operation, is passed longitudinally through the casing 4 and is sized for passage therethrough. Surface instrumentation, whose function will be discussed in more detail subsequently, is shown for processing and recording electrical measurements provided by the sonde 7. A well logging cable 8 which passes over a sheave wheel 9 supports the sonde 7 in the borehole and also provides a communication path for electrical signals to and from the surface equipment and the sonde 7. The well logging cable 8 may be of conventional armored design having one or more electrical conductors for transmitting such signals between the sonde 7 and the surface apparatus.

Again referring to FIG. 1, the sonde 7 contains a neutron source 11. The neutron source contemplated for use herein comprises a californium 252 continuous neutron source. Such a source has the meritorious feature of producing a very high intensity of neutrons essentially having an average energy of 2.3 MEV. However, it will be understood by those skilled in the art that the invention is not limited to the use of a continuous neutron source. It is contemplated that a pulsed neutron source of suitable intensity could be used if desired, provided that suitable source to detector spacings are also provided. For the purposes of the preferred embodiments of the present invention, however, the high intensity of the californium 252 neutron source is desirable.

Suitable radiation detectors 12 and 13 longitudinally spaced from each other and from the neutron source 11 are provided in the downhole tool. These detectors are operated as neutron detectors. In the present invention it is contemplated that detectors 12 and 13 are neutron detectors of the $He^3$ type. These are gas filled counting tubes filled with $He^3$ gas under pressure. The $He^3$ detectors respond to neutrons scattered back to the detectors 12 and 13 from the surrounding earth formations. Charge pulses established from nuclear reactions between the back scattered neutrons and the filling gas within the detectors 12 and 13 produce a satisfactory measure of the epithermal neutron population. Detectors 12 and 13 are connected to amplifiers 14 and 15 respectively which are connected to cable driving circuitry 16 for transmission of the electrical pulse signals from the detectors to the surface. Cable driving circuitry 16 may comprise, for example, an amplifier means and means for coding the pulses from the two detectors to separate them on the cable. This could be done, for example, by transmitting pulses from detectors as opposite signed electrical pulses on the cable in order that they may be distinguished and separated at the surface. Of course, other means could be used as desired. The portion of the sonde 7 between the neutron source 11 and detectors 12 and 13 is provided with a shield 17 of a neutron moderating material, for example, lucite plastic. This is provided in order to prevent the direct interaction of neutrons from the source with the two detectors since it is desired to measure the slowing down effect of the formations surrounding the borehole on the epithermal population.

Neutron detectors 12 and 13 of FIG. 1 are surrounded and enclosed by a cadmium shield 18 which is designed to screen out the entry of thermal neutrons to the interior of the detector structure. The higher energy epithermal neutrons penetrate the cadmium shield 18 more readily. Inside the cadmium shield 18 the neutron detectors are surrounded by and embedded in lucite plastic layer 19 or any other suitable high hydrogen content material.

Neutron detectors 12 and 13 of FIG. 1 are surrounded by the lucite or other high hydrogen content material in order to render them more sensitive to the epithermal neutrons which enter the detectors through the cadmium layer 18 from the earth formations surrounding the borehole. The cadmium layer surrounding the lucite shield is approximately 0.020 inches in thickness which is adequate to effectively attenuate the thermal neutron flux entering the detectors from the borehole. Moreover, the detectors are spaced from the californium 252 neutron source at an optimum distance to provide good counting statistics. The short spaced neutron detector 12 is preferably sized about 1 inch in diameter and has about 4 inches of effective sensitive length and contains $He^3$ at 1 atmosphere pressure. The long spaced detector 13 is sized about 2 inches in diameter, about 4 inches in effective sensitive length and contains $He^3$ at about 8 atmospheres pressure. Using a 700 microgram californium 252 neutron source which emits about $1.69 \times 10^9$ neutrons per second, it has been found that optimum source to detector spacings for these detectors are approximately 19 inches from the source to the center of the short spaced $He^3$ detector 12 and approximately 31 inches spacing from the center of the source to the center of the long spaced $He^3$ detector 13. These dimensions are applicable with the detectors configured as shown in the drawing of FIG. 1 when surrounded by the cadmium sleeve 18. The portion of the cadmium sleeve 18 interposed between the two detectors, as shown at 20 of FIG. 1, serves to limit the solid angle response of the detectors to the approximate borehole level opposite each detector.

In the configuration shown in FIG. 1 for the neutron detectors, it has been found that the epithermal neutron count rate is reduced by about a factor of 4 when the detectors are surrounded by the cadmium sleeve 18 as illustrated, from the count rate obtained with the same $He^3$ detectors not surrounded by the cadmium sleeve. This reduction in count rate would render the spacing from the source to detector too great to obtain good counting statistics when used with a lesser intensity neutron source than the californium 252. Moreover, it will be noted that the sensitivity of the neutron detectors 12 and 13 are unequal as the short spaced detector 12 contains $He^3$ at 1 atmosphere of pressure while the long spaced detector contains $He^3$ at 8 atmospheres pressure. Since the rate of epithermal neutron interaction with the $He^3$ in the detectors is proportional to the pressure or density of the $He^3$ material in the detectors, the longer spaced detector is more sensitive for a given cross-sectional area than the short spaced detector. This cooperative arrangement is also optimized for the use of the $1.69 \times 10^9$ neutron/sec. californium 252 neutron source in the configuration shown. It will be appreciated by those skilled in the art that other source-detector spacings of optimum design could be used with other neutron sources, if desired, and still remain within the inventive concepts of the present invention.

In any event, voltage pulses from the neutron detectors 12 and 13 are amplified by the amplifiers 14 and 15 as previously discussed and transmitted to the surface via the well logging cable 8 and cable driver circuits 16. At the surface, circuitry is shown schematically in block diagram form for interpreting the ratio of the counts in each of the two spaced neutron detectors and for recording a log of this ratio. Logs of the count rates from the individual detectors could also be made if desired. Signals from the upper or longer spaced detector which may be encoded in any manner desired as previously described, are detected as counts in the counter 21. Counts from the short spaced detector 12 are detected in a second counter 22. Counters 21 and 22 may be of any of the well known types of digital or proportional analog counters known in the art. Outputs from counter 21 and counter 22 are sampled and supplied into a ratio circuit 23 which produces an output signal proportional to the ratio of counts of the long spaced detector 13 divided by the counts occurring in short space detector 12. The relationship of this counts ratio is shown in FIG. 2 as a function of formation porosity for three different types of formations in cased boreholes. It will be observed from FIG. 2 that the higher the counts ratio of the counts in the long spaced to the short spaced detector the less is the porosity of the formations surrounding the borehole. This is due to the phenomenon that a high porosity formation will generally contain more hydrogen bearing compounds such as oil or water in its pores and will therefore more rapidly attenuate the neutron flux emanating from the neutron source 11 than a lower porosity formation. The dual spaced epithermal neutron log of the present invention makes an accurate measure of the hydrogen index of the formation. The hydrogen index is defined as the quantity of hydrogen per unit volume of formation.

The output signals from the detectors 12 and 13 in the downhole tool, when taken in ratio form by the ratio circuit 23 which may be of conventional analog or digital design, are supplied to a recorder 24, which as indicated by dotted line 25, is driven either electrically or mechanically by the sheave wheel 9 as a function of borehole depth. Thus, a record is produced on a record medium 26 of a continuous recording of the ratio of counts of the long spaced to short spaced detector as a function of borehole depth. This ratio may be interpreted as illustrated by FIG. 2 in terms of porosity of the earth formations surrounding the borehole. If desired, of course, the scale of the log 26 may be calibrated directly in terms of porosity units if desired.

It will be understood by those skilled in the art that the power supply circuits 27 may be used to furnish electrical power for the downhole portion of the equipment via the well logging cable 8 and that downhole power circuits (not shown) are utilized to power the electronic circuitry shown in the downhole tool.

Although the sonde 7 shown in the drawing of FIG. 1 is suspended freely in the borehole 2, characteristics of the earth formation surrounding the borehole and the borehole environment itself, may make it advisable to centralize the housing of the sonde 7 within the borehole by means of bow springs or the like (not shown). Alternatively, a backup pad (not shown) can be used to urge the housing of the tool against the borehole wall. However, with the operating parameters as described for the source to detector spacing, the source composition, and intensity and the geometry shown in the drawing of FIG. 1 minimum sensitivity to borehole diameter, position, or salinity of borehole fluid has been found when performing the porosity log of the present invention. It has also been found that at low porosities the corrections for lithology between sandstones and limestones of the formation are smaller than that which would be required where detectors are set up to detect thermal neutrons in the manner suggested in the prior art. Similarly, the apparatus as shown and described minimizes the effect of neutron absorbers such as boron in low porosity formations surrounding the borehole.

Boron, a strong thermal neutron absorber, is an indicator of formation shaliness. Thus, the prior art thermal neutron logs for porosity can be affected by the presence of shale to spuriously indicate high porosity. This effect is compounded because such logs will also react to bound water held in shales which is not a true porosity indicator. Since the dual spaced epithermal neutron log is relatively unaffected by boron, the present invention can provide a more accurate determination of hydrogen index in shaly formations than those of the prior art.

In order to obtain sufficient epithermal neutrons to obtain good counting statistics, a strong neutron source such as the $1.69 \times 10^9$ neutron/sec. californium 252 source of the present invention is necessary. Also because the californium 252 source emits most of its neutrons in the 2.53 MEV range this is more conductive to thermal and epithermal measurements than a higher energy source, since the neutrons do not have to be slowed as much to reach thermal or epithermal energy.

Measurements made with the apparatus and using the methods of the present invention have been found to give a useful quantitative measurement of the hydrogen index (that is, the amount of hydrogen per unit of volume) which is present in the formations surrounding the borehole. Moreover, the relatively close center-to-center spacing of the detectors gives accurate bed boundary definitions making the measurement of porosity through the casing in a cased well feasible for secondary completion operations in the well, if desired.

The foregoing description may make other alternative embodiments of the invention apparent to those skilled in the art. It is therefore the aim in the appended claims to cover all such changes and modifications as fall within the true spirit and scope of the invention.

We claim:

1. A method for measuring the porosity of earth formations in the vicinity of a well borehole comprising the steps of:
    irradiating the earth formations in the vicinity of the borehole with fast neutrons from a relatively high intensity neutron source;
    detecting essentially only the epithermal neutron population at a first spaced distance from said source in the borehole;
    detecting essentially only the epithermal neutron population at a second different spaced distance from said source in the borehole;
    discriminating against the detection of the thermal neutron population at said two spaced distances from said source in the borehole; and
    combining the epithermal neutron population measurements made at said two different spaced distances to derive an indication of formation porosity.

2. The method of claim 1 wherein the step of combining said epithermal neutron population measurements includes taking a ratio of said measurements to provide an indication of the hydrogen index of said earth formations.

3. The method of claim 1 wherein the irradiating step is performed by irradiating the earth formations in the vicinity of the well borehole with a neutron source comprising a californium 252 source emitting approximately $1.69 \times 10^9$ neutrons/sec.

4. The method of claim 3 wherein the two epithermal neutron detecting steps are performed at spaced distances of about 19 and 31 inches from said californium 252 neutron source by employing cadmium wrapped $He^3$ detectors having effective sensitive centers at these distances.

5. Apparatus for measuring a porosity related characteristic of earth formations in the vicinity of a well borehole comprising:
    a fluid tight body member sized for passage in a borehole and housing;
    a relatively high intensity source of fast neutrons;
    a first epithermal neutron detector spaced a first longitudinal distance from said neutron source;
    a second epithermal neutron detector spaced a second different longitudinal distance from said neutron source;

shielding means for discriminating against the detection of thermal neutrons at said two different spaced epithermal neutron detectors; and means responsive to signals from said epithermal neutron detectors to generate a signal related to a porosity characteristic of the earth formations in the vicinity of the borehole.

6. The apparatus of claim 5 wherein said neutron source comprises a californium 252 source capable of emitting approximately $1.69 \times 10^9$ neutrons/sec.

7. The apparatus of claim 6 wherein said first epithermal neutron detector is spaced with its effective sensitive center 19 inches from the effective center of said neutron source and said second epithermal neutron detector is spaced with its effective sensitive center approximately 31 inches from the effective center of said neutron source.

8. The apparatus of claim 7 wherein said epithermal neutron detectors comprise $He^3$ neutron detectors embedded in a neutron moderating material and the whole surrounded by a thermal neutron absorbing material.

9. The apparatus of claim 8 wherein said $He^3$ neutron detectors are embedded in lucite plastic material and the whole is surrounded by a cadmium shield approximately 0.020 inches thick.

* * * * *

UNITED STATES PATENT OFFICE
CERTIFICATE OF CORRECTION

Patent No. 3,774,033    Dated November 20, 1973

Inventor(s) Hubert D. Scott and Michael P. Smith

It is certified that error appears in the above-identified patent and that said Letters Patent are hereby corrected as shown below:

Insert at the beginning of Column 1:

"The invention described herein was made in the course of, or under Contract Number AT(38-1)-540 with the United States Atomic Energy Commission."

Column 5, line 67, delete "conductive" and insert therefor --conducive--.

Signed and sealed this 16th day of April 1974.

(SEAL)
Attest:

EDWARD M. FLETCHER, JR.
Attesting Officer

C. MARSHALL DANN
Commissioner of Patents